(12) United States Patent
Bao et al.

(10) Patent No.: US 11,750,438 B2
(45) Date of Patent: Sep. 5, 2023

(54) NETWORK LOG TIME ALIGNMENT METHOD, APPARATUS, AND HOST

(71) Applicant: HUAWEI TECHNOLOGIES CO., LTD., Shenzhen (CN)

(72) Inventors: Dewei Bao, Nanjing (CN); Donghong Peng, Shenzhen (CN); Yaodong Guan, Beijing (CN); Shihao Li, Beijing (CN); Zhiqiang Li, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 2 days.

(21) Appl. No.: 17/480,477

(22) Filed: Sep. 21, 2021

(65) Prior Publication Data

US 2022/0006685 A1    Jan. 6, 2022

Related U.S. Application Data (63) Continuation of application No. 16/111,234, filed on Aug. 24, 2018, now Pat. No. 11,140,022, which is a
(Continued)

(30) Foreign Application Priority Data

Feb. 24, 2016 (CN) .......................... 201610102268.5

(51) Int. Cl.
*G06F 15/173* (2006.01)
*H04L 41/0631* (2022.01)
(Continued)

(52) U.S. Cl.
CPC .......... *H04L 41/064* (2013.01); *H04L 41/065* (2013.01); *H04L 41/069* (2013.01); *H04L 41/0677* (2013.01); *H04L 41/0856* (2013.01)

(58) Field of Classification Search
CPC . H04L 41/064; H04L 41/065; H04L 41/0677; H04L 41/069; H04L 41/0856
See application file for complete search history.

(56) References Cited

U.S. PATENT DOCUMENTS 8,812,586 B1 * 8/2014 Kulkarni ................. H04L 43/08
709/203
9,800,455 B1   10/2017 Upshur et al.
(Continued)

FOREIGN PATENT DOCUMENTS

CN        101925084 A    12/2010
CN        102413013 A     4/2012
(Continued)

*Primary Examiner* — John B Walsh
(74) *Attorney, Agent, or Firm* — Maier & Maier, PLLC (57) ABSTRACT

A network log time alignment method and an apparatus are provided. The method includes: obtaining log data stored in multiple network devices; parsing the log data to obtain features of each network device; determining associated features of the multiple network devices according to the features of each network device, where the associated features are features that are of the network devices and that have an association in space; and then, performing alignment on log time in multiple pieces of log data according to the associated features. Therefore, associated features of related devices of a network fault can be found, and log time are automatically aligned according to the associated features, thereby improving the efficiency and the accuracy of the fault location and sectionalization.

16 Claims, 4 Drawing Sheets

Related U.S. Application Data continuation of application No. PCT/CN2017/073665, filed on Feb. 15, 2017.

(51) Int. Cl.
*H04L 41/0677* (2022.01)
*H04L 41/069* (2022.01)
*H04L 41/0853* (2022.01)

(56) References Cited

U.S. PATENT DOCUMENTS

| | | |
|---|---|---|
| 11,140,022 B2 * | 10/2021 | Bao ............... H04L 41/0856 |
| 2007/0283194 A1 * | 12/2007 | Villella ............ G06F 11/3476 |
| | | 714/E11.204 |
| 2008/0201580 A1 | 8/2008 | Savitzky et al. |
| 2011/0154367 A1 | 6/2011 | Gutjahr et al. |
| 2011/0214020 A1 | 9/2011 | Caspi et al. |
| 2012/0005542 A1 | 1/2012 | Petersen et al. |
| 2012/0170905 A1 | 7/2012 | Brundula |
| 2013/0129345 A1 | 5/2013 | Meng et al. |
| 2014/0006871 A1 | 1/2014 | Lakshmanan et al. |
| 2015/0382156 A1 | 12/2015 | Gruteser et al. |
| 2017/0116067 A1 | 4/2017 | Damron et al. |

FOREIGN PATENT DOCUMENTS

| | | |
|---|---|---|
| CN | 104601349 A | 5/2015 |
| CN | 105262812 A | 1/2016 |
| WO | 2013098316 A1 | 7/2013 |

* cited by examiner

— NETWORK LOG TIME ALIGNMENT METHOD, APPARATUS, AND HOST

CROSS-REFERENCE TO RELATED APPLICATIONS

This application is a continuation of a continuation of U.S. patent application Ser. No. 16/111,234, filed on Aug. 24, 2018, which is a continuation of International Application No. PCT/CN2017/073665, filed on Feb. 15, 2017. The International Application claims priority to Chinese Patent Application No. 201610102268.5, filed on Feb. 24, 2016. All of the aforementioned patent applications are hereby incorporated by reference in their entireties.

TECHNICAL FIELD

The embodiments relate to the field of the Internet, and in particular, to a network log time alignment method, an apparatus, and a host.

BACKGROUND

Figure 1:
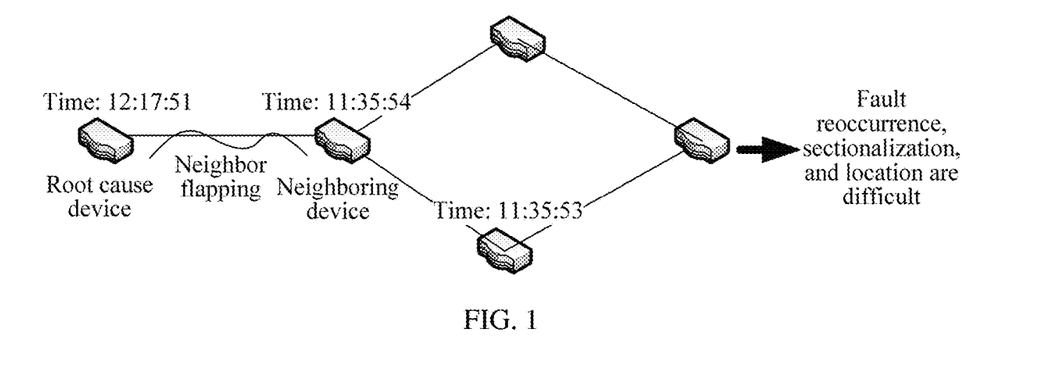
FIG. 1 is a schematic diagram of a scenario in which logs of network devices are not aligned when a network is faulty according to an embodiment.

At present, in a network fault sectionalization (determining a range of a fault and a device causing the fault) and location (determining a root cause of the fault) process, and particularly, in a scenario in which a fault of a single device causes a fault occurring in a neighboring device, logs of multiple devices usually need to be analyzed, and fault reoccurrence is performed according to time information of event occurrence in the logs, so as to finally track the root cause of a located fault. As shown in FIG. 1, neighboring devices and a root cause device all record an intermediate system to intermediate system (ISIS) protocol neighbor flapping log, but it is difficult to determine a device that is the root cause device of a fault.

In the prior art, a log server is deployed to acquire log data, time data information in received log data is converted into a time of the server, and a standard time of a log is obtained according to a time difference between the log server and a standard server.

In an existing technical solution, the log server needs to be deployed. However, there is neither network management system nor log server in many networks during deployment. In such scenarios, logs of devices in the network are dispersedly recorded in the devices locally for storage. When needing to be analyzed, the logs are manually acquired and analyzed offline. In addition, there is no requirement for clock synchronization between the devices, and no uniform clock source is deployed in the network. Consequently, time of the devices are usually not aligned, that is, time of logs recorded by the devices at a same time point have different time stamps. In addition, although the log server is deployed in the network, in a network having a large quantity of devices, a single log server is incapable of processing lots of log data in real time. If multiple log servers are deployed, a problem of time asynchronization between the log servers also exists.

SUMMARY

Embodiments provide a network log time alignment method, an apparatus, and a host, so that network log time of different network devices can be automatically aligned, thereby facilitating fault reoccurrence, and improving efficiency and accuracy of fault location and sectionalization.

According to a first aspect, an embodiment provides a network log time alignment method, including: obtaining to-be-analyzed log data of multiple network devices; parsing the log data of the multiple network devices to obtain features of each network device; determining associated features of the multiple network devices according to the features of each network device; and performing alignment on log time in the log data of the multiple network devices according to the associated features.

By way of the solution in the embodiments, when the network devices are faulty, a fault of a root cause device causes faults occurring in other devices in network neighborhood. The fault of the root cause device certainly has a relationship with the neighboring devices in essence. Therefore, in the embodiments, the associated features that are of the network devices and that have an association relationship in space are found, to perform alignment on log time in multiple pieces of log data of the network devices according to the associated features. Therefore, in the embodiments, the log time can be automatically aligned without deployment of a log server, thereby facilitating fault reoccurrence, and improving efficiency and accuracy of fault location and sectionalization.

With reference to the first aspect, in a first possible implementation of the first aspect, the parsing the log data of the multiple network devices to obtain features of each network device includes: for each network device, recognizing mutation points in log data of the network device, and determining log items corresponding to the mutation points as the features of the network device.

The fault of the root cause device causes the faults occurring in the other devices in the network neighborhood, and time at which faults occur are actually the same. Therefore, exception detection may be performed on each device, to find the mutation points in the log data as candidate features, so that implementability of the solution is improved.

With reference to the first aspect, in a second possible implementation of the first aspect, the parsing the log data of the multiple network devices to obtain features of each network device includes: obtaining identical events in the log data of the multiple network devices by way of analysis; and for each network device, determining log items that correspond to the identical events and that are in log data of the network device as the features of the network device.

When the root cause device is faulty, a neighboring device usually records a log of a same type. Therefore, by way of the method, the identical events between the devices can be found from event types of the log data, and the log items corresponding to the events are used as the features of the device, so that the implementability of the solution is improved.

With reference to the first aspect, in a third possible implementation of the first aspect, the method further includes: obtaining pairing events in a system; and the parsing the log data of the multiple network devices to obtain features of a network device corresponding to each piece of log data includes: recognizing the pairing events in the log data of the multiple network devices; and for each network device, determining log items corresponding to the pairing events as the features of the network device.

With reference to the first aspect or the third possible implementation of the first aspect, in a fourth possible implementation of the first aspect, the method further includes: obtaining pairing statuses in a system; and the parsing the log data of the multiple network devices to obtain features of each network device includes: recognizing the pairing statuses in the log data of the multiple network devices; and for each network device, determining log items corresponding to the pairing statuses as the features of the network device.

It should be noted that the obtained pairing events and statuses in the system are an event pair and a status pair of a common fault in an entire network. Such event pairs and status pairs that have an absolute correlation may be found in the log data as features of the network devices, so that the implementability of the solution is improved.

With reference to any one of the possible implementations of the first aspect, in a fifth possible implementation of the first aspect, each network device has multiple features, and the determining associated features of the multiple network devices according to the features of each network device includes: determining features having a maximum correlation in multiple features of the multiple network devices, where the features having the maximum correlation are the associated features of the multiple network devices.

With reference to any one of the possible implementations of the first aspect, in a sixth possible implementation of the first aspect, the performing alignment on log time in the log data of the multiple network devices according to the associated features includes: obtaining a reference time for log alignment, where the reference time is a log time of the associated feature in log data of a reference network device, and the reference network device is a network device determined in the multiple network devices; and for each network device, determining a calibration time deviation of the network device, where the calibration time deviation is a difference between a log time of the associated feature of the network device and the reference time, and subtracting the calibration time deviation from a log time in log data of the network device, so that the log time of the network device is aligned with a log time of the reference network device.

With reference to any one of the possible implementations of the first aspect, in a seventh possible implementation of the first aspect, the performing alignment on log time in the log data of the multiple network devices according to the associated features includes: setting a reference time of the associated features, where the reference time is a fault report time; and for each network device, determining a calibration time deviation of the network device, where the calibration time deviation is a difference between a log time of the associated feature of the network device and the reference time, and subtracting the calibration time deviation from a log time in log data of the network device, so that the log time of the network device is aligned with a log time of another network device.

According to a second aspect, an embodiment provides a network log processing apparatus. The apparatus includes: a log obtaining module, configured to obtain to-be-analyzed log data of multiple network devices; a feature parsing module, configured to parse the log data of the multiple network devices to obtain features of each network device; an associated feature determining module, configured to determine associated features of the multiple network devices according to the features of each network device; and a log time alignment module, configured to perform alignment on log time in the log data of the multiple network devices according to the associated features.

With reference to the second aspect, in a first possible implementation of the second aspect, the feature parsing module is configured to: for each network device, recognize mutation points in log data of the network device, and determine log items corresponding to the mutation points as the features of the network device.

With reference to the second aspect, in a second possible implementation of the second aspect, the feature parsing module is configured to: obtain corresponding identical events in the log data of the multiple network devices by way of analysis; and for each network device, determine log items that correspond to the identical events and that are in log data of the network device as the features of the network device.

With reference to the second aspect, in a third possible implementation of the second aspect, the apparatus further includes: an event pair obtaining module, configured to obtain pairing events in a system; and the feature parsing module is configured to: recognize the pairing events in the log data of the multiple network devices; and for each network device, determine log items that correspond to the pairing events and that are in log data of the network device as the features of the network device.

With reference to the second aspect or the third possible implementation of the second aspect, in a fourth possible implementation of the second aspect, the apparatus further includes: a status pair obtaining module, configured to obtain pairing statuses in a system; and the feature parsing module is configured to: recognize the pairing statuses in the log data of the multiple network devices; and for each network device, determine log items that correspond to the pairing statuses and that are in log data of the network device as the features of the network device.

With reference to any one of the possible implementations of the second aspect, in a fifth possible implementation of the second aspect, each network device has multiple features; and the associated feature determining module is configured to determine features having a maximum correlation in multiple features of the multiple network devices, where the features having the maximum correlation are the associated features of the multiple network devices.

With reference to any one of the possible implementations of the second aspect, in a sixth possible implementation of the second aspect, the log time alignment module is configured to: obtain a reference time for log alignment, where the reference time is a log time of the associated feature of a reference network device, and the reference network device is a network device determined in the multiple network devices; and for each network device, determine a calibration time deviation of the network device, where the calibration time deviation is a difference between a log time of the associated feature of the network device and the reference time, and subtract the calibration time deviation from a log time in log data of the network device, so that the log time of the network device is aligned with a log time of the reference network device.

With reference to any one of the possible implementations of the second aspect, in a seventh possible implementation of the second aspect, the log time alignment module is configured to: set a reference time of the associated features, where the reference time is a fault report time; and for each network device, determine a calibration time deviation of the network device, where the calibration time deviation is a difference between a log time of the associated feature of the network device and the reference time, and subtract the calibration time deviation from a log time in log data of the network device, so that the log time of the network device is aligned with a log time of another network device.

According to a third aspect, an embodiment provides a host. The host includes a memory and a processor. The memory is configured to store an application program. The processor is configured to execute the application program, so as to: obtain to-be-analyzed log data of multiple network devices from the memory; parse the log data of the multiple network devices to obtain features of each network device; determine associated features of the multiple network devices according to the features of each network device; and perform alignment on log time in the log data of the multiple network devices according to the associated features.

According to a fourth aspect, an embodiment further provides a computer storage medium. The medium stores a program. The program performs some or all steps in the method according to the first aspect.

It can be understood from the foregoing solutions that the solutions in the embodiments have the following beneficial effects:

In the embodiments, no log server needs to be deployed, and log alignment is performed by using the following principle: when network devices are faulty, a fault of a root cause device causes faults occurring in other neighboring devices in network neighborhood. The fault of the root cause device certainly has a relationship with these neighboring devices in essence. Therefore, in an embodiment, when log analysis needs to be performed, log data stored in multiple network devices is first obtained, multiple pieces of log data are parsed to obtain features of a network device corresponding to each piece of log data, and then associated features are determined in the features. The associated features are features that are of the network devices and that have an association in space. Then, alignment is performed on log time in the multiple pieces of log data according to the associated features. Therefore, in an embodiment, the log time can be automatically aligned, thereby facilitating fault reoccurrence, and improving efficiency and accuracy of fault location and sectionalization.

DETAILED DESCRIPTION OF THE EMBODIMENTS

To make persons skilled in the art understand the solutions in the embodiments better, the following describes the solutions in the embodiments with reference to the accompanying drawings.

A problem to be resolved in the embodiments is that a fault of a root cause device causes faults of other neighboring devices in a network. In a fault sectionalization and location process, logs of the root cause device and the neighboring devices need to be associated together for analysis, and fault reoccurrence is performed according to time information of event occurrence in the logs, so as to perform sectionalization and location. In such problems, the root cause device certainly has a relationship with the neighboring devices in essence, and because there is neither clock synchronization server nor log server in the network, time misalignment exists between the devices. Consequently, time stamps corresponding to events occurring at a same time are different.

In an existing network, when no log server is deployed, log data is stored offline in devices. When needing to be analyzed, the log data is taken out for offline analysis. An objective of the embodiments is to make log time of the devices aligned, thereby facilitating subsequent analysis and location of a root cause of a problem. Therefore, whether an aligned time is a standard time during log recording is not considered, provided that the log time of the devices are aligned.

Based on this, the embodiments provides a network log time alignment method. Information such as log data of network devices in a faulty network is collected; features that are of the network devices and that have an association are obtained by way of parsing and by using a related algorithm of data parse; then, data of the features of the network devices is summarized, and features that are of the devices and that have a maximum association are calculated, to find alignment points of the network devices in space; and then a reference time corresponding to the features is set. A time difference between a log time of an associated feature of each network device and the reference time is calculated, to perform re-calibration on log time of all logs of the network device.

The network device in the embodiments may be a network device such as a computer (including a personal computer or a server), a hub, a switch, a bridge, a router, a radio access point, a printer, a modem, or a transceiver. The network device is referred to as a device for short in the following embodiments.

Figure 2:
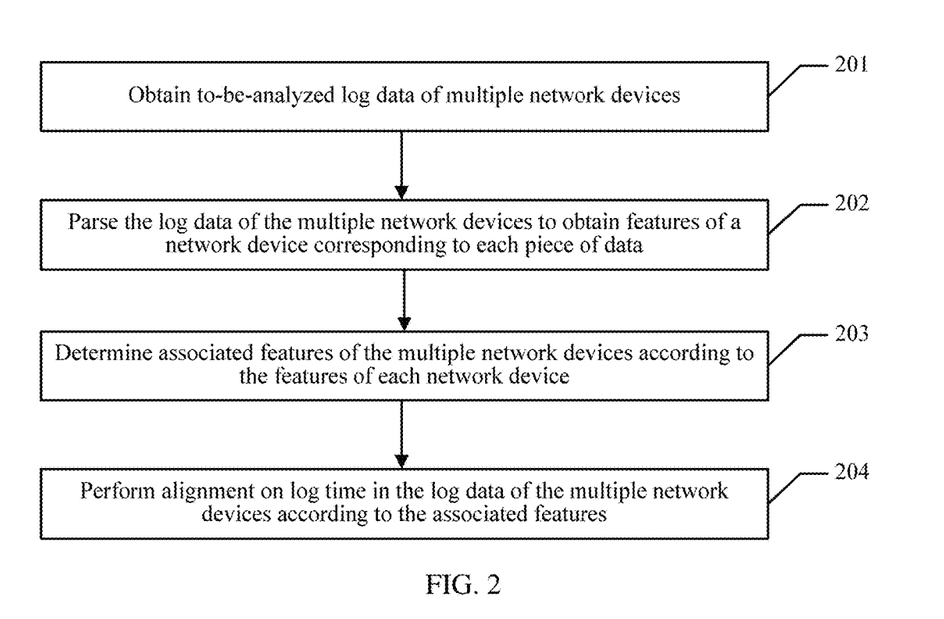
FIG. 2 is a flowchart of a network log time alignment method according to an embodiment.

The method in the embodiments is performed by a network log processing apparatus. The apparatus may be a device loaded with a network log alignment application program. For example, the apparatus may be a server, or may be a personal computer. With reference to FIG. 2, the network log time alignment method in the embodiments is described below in detail.

201: Obtain to-be-analyzed log data of multiple network devices.

The network log processing apparatus obtains the log data of the multiple devices in a faulty network. A specific obtaining manner may be as follows.

A user collects offline logs of the devices in the faulty network and inputs the collected offline logs into the network log processing apparatus for analysis. The offline logs may be input in a form of log data packets. A specific log input manner is not limited, may be that the network log processing apparatus provides a log input screen and a user enters the offline logs by using the log input screen, or may be inputting, by using an input interface provided by a log alignment application program, the offline logs from another application program invoking the input interface.

Alternatively, the to-be-analyzed log data of the devices may be directly obtained by the network log processing apparatus from a memory. The memory stores raw log data of each device in the faulty network.

The log data obtained in this embodiment may include, but is not limited to, the following information: a logging time, a device identifier (ID), or logging content. In addition, in addition to log information, the obtained offline logs may further include other data for analysis assistance, for example, may include topology information in the network, so that the network log processing apparatus can perform feature analysis more accurately with reference to the topology information.

202: Parse the log data of the multiple network devices to obtain features of each network device.

After obtaining the log data of the devices in the faulty network, the network log processing apparatus parses the to-be-analyzed log data to obtain candidate features in logs. The features include: exception features of exceptions occurring in the multiple devices in the network, various events or event statuses in the logs, or the like.

A method for obtaining the features by way of parsing includes, but is not limited to, the following three types:

1) Exception Detection-Based Association

A fault of a root cause device causes faults of other devices in network neighborhood. Consequently, during a network exception, related devices are faulty. Therefore, exception features are certain to exist. In addition, due to impact of the fault of the root cause device, time at which the exception features occur are actually the same. Therefore, exception detection may be performed on each device, to obtain mutation points of a log in the device. Log items corresponding to the mutation points of the log in each device is features of a network device corresponding to the log. The log item is an event type, for example, a behavior or a status such as login or down, recorded in a log.

Exception detection methods include: a density-based exception detection method, a type-based exception detection method, a status-based exception analysis method, and the like. Related algorithms include: a clustering algorithm, a singular value decomposition (SVD), a hidden Markov model (HMM), a Naive Bayesian Model (NBM), an approximate entropy, and the like.

Figure 3:
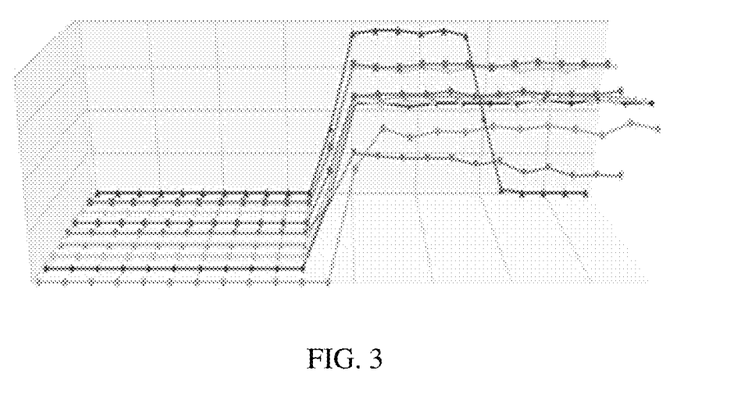
FIG. 3 is a schematic diagram of a result of log data detection performed based on an exception detection method according to an embodiment.

FIG. 3 is a schematic diagram of exception curves of log data of multiple network devices. Each curve represents log data of a device. A point at which the curve changes from a horizontal direction to an oblique direction in the figure is an exception mutation point. Time at which mutation points of the devices occur are basically the same. Log items corresponding to the mutation points are features of a network device corresponding to the log curve.

2) Event-Based Association

A log may be classified into multiple event types, for example, events such as login and purge. A set of such events is referred to as a log template. Analysis of the event-based association means parsing the log template, that is, obtaining, by way of analysis, types of log events occurring in each network device. Then, identical events between the devices are found. Log items that are in a log of each device and that correspond to the identical events are features of the device.

Algorithms of parsing the log template include: a clustering algorithm, a Naive Bayesian Model (NBM), a decision tree classification, and the like.

Figure 4:
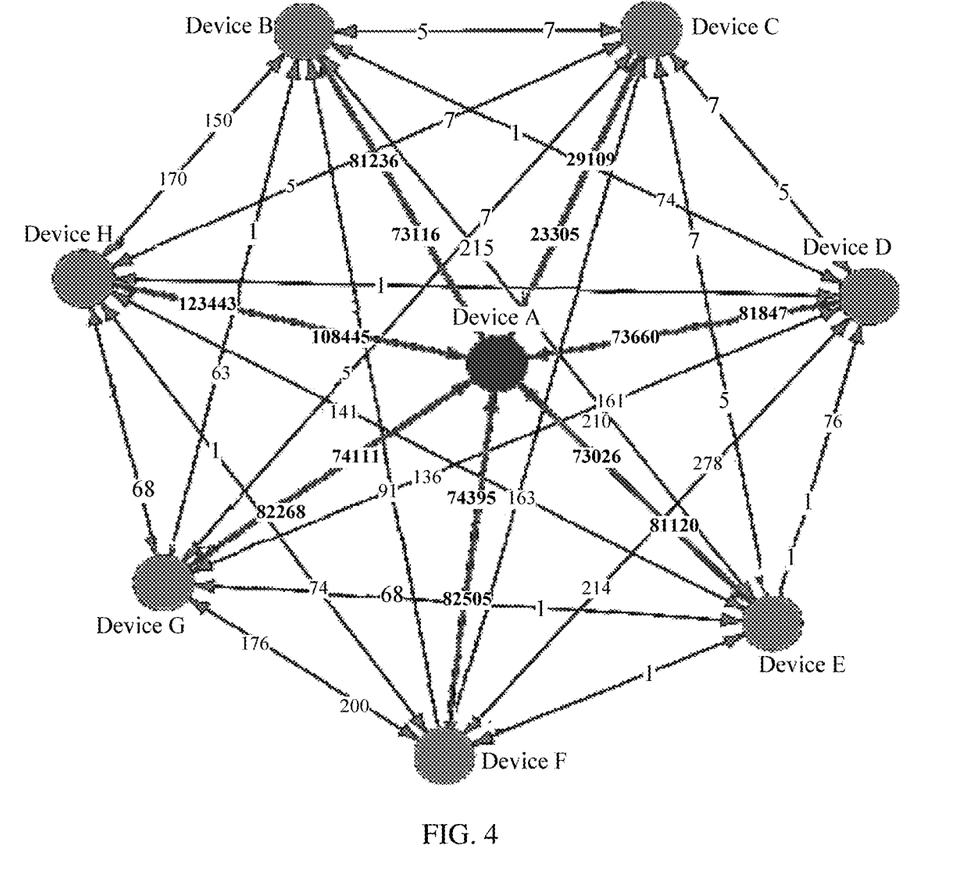
FIG. 4 is a schematic diagram of log data detection performed based on event association detection according to an embodiment.

For example, during IS-IS neighbor flapping, each router records a log of a same type during purge, and an event relationship network is formed according to neighboring device information recoded in the log. As shown in FIG. 4, a central point: a device A in the figure is a root cause device, and a device B, a device C, a device D, a device F, a device G, and a device H are neighboring devices. A fault of the device A causes faults of the devices B, C, D, E, F, G, and H. Each device records a log of a same type. A quantity of time of IS-IS neighbor flapping between the devices are shown by numbers on connection lines between the devices in the figure.

3) Event Pair-Based or Event Status Pair-Based Association

When a network is faulty, an association change of events or statuses between the devices may occur, including: occurrence of an event A necessarily causes occurrence of an event B of another device, or occurrence of a status A in a log necessarily causes occurrence of a status B in a log of another device. Such pairing events or statuses have 100% of a time association. For example, a protocol request necessarily causes a protocol reply, and a change of a status of a port A to a down status causes a change of a status of a neighboring port.

Therefore, in the embodiments, an expert knowledge base is introduced to define pairing events (event pair for short) or pairing statuses (status pair for short). An expert maintains an event pair and a status pair of a common fault in an entire network.

For example, the event pair or the status pair may be introduced by way of configuration of the expert knowledge base provided by the network log processing apparatus. Alternatively, the event pair or the status pair may be input by using an input interface of the expert knowledge base provided by the network log processing apparatus. A specific data format is as follows.

1) Format of an Event Pair:

| Index | Event A | Event B | Event C | ... |

Index: used to search for the event pair.
Events A, B, and C: Each column defines a type of events. Such an event is recorded in a log, and the event may be found in the log according to the definition.

2) Format of a Status Pair:

| Index | Event | Status A | Status B | ... |

Index: used to search for the event status pair.
Event: defining a type of event. Such an event is recorded in a log, and the event may be found in the log according to the definition.
Status A and status B: which are corresponding event statuses in the event.

After an event pair or a status pair maintained by the expert is obtained, log items corresponding to the events or the statuses are recognized, according to the event pair or the status pair maintained by the expert, from the log data and are used as features of devices corresponding to the logs.

It should be noted that association analysis may be performed only based on the event pair or may be performed only based on the status pair, or may be performed by combining the event pair and the status pair. When the association analysis is performed by combining the event pair and the status pair, events corresponding to the status pair may be events based on the event pair.

Optionally, topology information of the faulty network may also be combined, and events or statuses in the event pair or the status pair that is defined in the expert knowledge base may be recognized from the log data more accurately according to a connection relationship between the devices.

203: Determine associated features of the multiple network devices according to the features of each network device.

After the features of each device are obtained by way of parsing from log data of the network device, association analysis is performed on features of all the network devices, to find features that are of the multiple network devices and that have an association relationship. An analysis method includes, but is not limited to, a similarity algorithm. For example, features that are of the devices and that have a maximum association may be found, as the associated features, from the features obtained by way of parsing. The associated features are associated in space.

Optionally, after the associated features of the multiple network devices are determined, an analysis result is fed back to the network log processing apparatus. The network log processing apparatus presents the analysis result by using a user interface. Information presented on the user interface includes, but is not limited to, information such as a visualized graphical interface, raw log time points that are of the devices and that correspond to the associated features, or raw logs of the devices. Optionally, a user may determine the associated features on a presentation interface of the analysis result and trigger a program to start to perform log time alignment.

204: Perform alignment on log time in the log data of the multiple network devices according to the associated features.

The associated features have an association relationship between the devices, and logging time of the associated features should be theoretically the same. Therefore, after the associated features of the multiple network devices are determined, a reference time for log time alignment may be determined according to the associated features. A manner of determining the reference time for log alignment includes, but is not limited to, the following two types:

1. A raw logging time of an associated feature of a device is used as a reference time.

A raw log time of the associated feature of any network device (a reference network device) is selected as the reference time, a time difference between a log time of the associated feature of each device (a compared network device) and the reference time is calculated to obtain a log calibration time deviation of the compared network device, and a calibration time deviation of each compared network device is subtracted from a log time in log data of the compared network device, so that the log time of the compared network device is aligned with a log time of the reference network device.

For example, alignment is performed on log data time of three devices A, B, and C. After log data of the three devices is obtained by way of step 201, the log data of the three devices A, B, and C is analyzed by way of step 202 to obtain (candidate) features of the three devices; and features having a maximum association are found by way of parsing and by way of step 203 from the features obtained in step 202 and are used as associated features. If logging time of the associated features of the three devices A, B, and C are respectively 12:17:51, 11:35:54, and 11:35:53, a logging time of the associated feature of any one of the devices is selected as the reference time. If the logging time 11:35:54 of the associated feature of B is selected as the reference time, a calibration time deviation of the device A is equal to 42:57 obtained by subtracting 11:35:54 from 12:17:51, a calibration time deviation of the device B is equal to 0 by subtracting 11:35:54 from 11:35:54, and a calibration time deviation of the device C is equal to −00:01 obtained by subtracting 11:35:54 from 11:35:53. Therefore, 42 minutes and 57 seconds are subtracted from all to-be-aligned log time in offline log data of the device A, so that the log time are aligned with a log time of the device B. Alignment does not need to be performed in the device B. One second is added to all to-be-aligned log time in offline log data of the device C, so that the log time are aligned with the log time of the device B.

2. A reference time of the associated features is set.

The logging time of the associated features should be theoretically the same. Therefore, an alignment reference time is set for the associated features. Preferably, a specified alignment reference time is a fault report time. The fault report time may be manually controlled or may be recorded in a system. Then, the specified alignment reference time of the associated features is subtracted from a log time of the associated feature in a log record of each device, to obtain a log calibration time deviation of the device. Then, a calibration time deviation of each device is subtracted from a log time in log data of the device, so that the log time of the device is aligned with a log time of another device.

The example in the first method is used. If logging time of associated features of three devices A, B, and C are respectively 12:17:51, 11:35:54, and 11:35:53, and a log alignment time of the associated features is set to 11:35:00, a calibration time deviation of the device A is equal to 42:51 obtained by subtracting 11:35:00 from 12:17:51, a calibration time deviation of the device B is equal to 00:54 obtained by subtracting 11:35:00 from 11:35:54, and a calibration time deviation of the device C is equal to 00:53 obtained by subtracting 11:35:00 from 11:35:53. Therefore, all to-be-aligned log time in offline log data of the device A are increased by 42 minutes and 51 seconds. All to-be-aligned log time in offline log data of the device B are increased by 54 seconds. All to-be-aligned log time in offline log data of the device C are increased by 53 seconds. In such a manner, log time of all the devices can be aligned.

It should be noted that in the second method, a manner of setting the reference time of the associated features is not limited, and may be that the network log processing apparatus provides a user setting interface and a user performs setting by using the setting interface.

Optionally, for a log of a device on which log time alignment has been performed, a user may choose to perform visualization analysis or output a log obtained after time alignment to perform fault analysis.

Optionally, after performing alignment on the log time of the network device, the network log processing apparatus may re-output an aligned log to perform fault analysis.

In this embodiment, no log server needs to be deployed, and log alignment is performed by using the following principle: when network devices are faulty, a fault of a root cause device causes faults of other neighboring devices in a network. The fault of the root cause device certainly has a relationship with the neighboring devices in essence. Therefore, in the embodiments, when the log alignment is performed, log data stored in multiple network devices is first obtained; multiple pieces of log data are parsed to obtain features of a network device corresponding to each piece of log data; and associated features are then determined in the features. The associated features are features that are of the network devices and that have an association in space. Time at which the associated features occur are considered to be the same. Then, alignment is performed on log time in the multiple pieces of log data according to the associated features. Therefore, in the embodiments, time alignment can be automatically performed on to-be-analyzed logs without relying on a log server, thereby facilitating fault reoccurrence, and improving efficiency and accuracy of fault location and sectionalization.

The method in the embodiments is described above, and a network log processing apparatus in the embodiments of the present invention is described below from the perspective of function modules.

Figure 5:
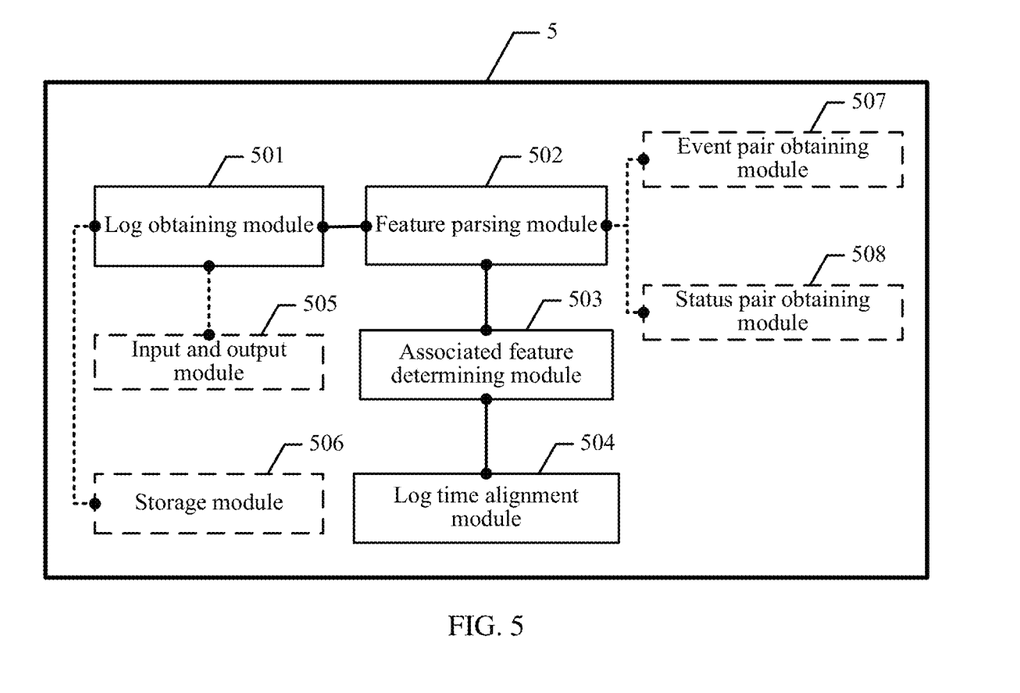
FIG. 5 is a schematic structural diagram of function modules of a network log processing apparatus according to an embodiment.

A log obtaining module 501 is configured to obtain multiple pieces of to-be-analyzed log data.

A feature parsing module 502 is configured to parse the multiple pieces of log data to obtain features of a network device corresponding to each piece of log data.

An associated feature determining module 503 is configured to determine associated features of the multiple network devices according to the features of each network device.

A log time alignment module 504 is configured to perform alignment on log time in the multiple pieces of log data according to the associated features.

In some specific implementations, the network log processing apparatus further includes an input and output module 505, configured to input the to-be-analyzed log data of the devices. The log obtaining module 501 is configured to obtain, by using the input and output module 505, the multiple pieces of to-be-analyzed log data.

In some specific implementations, the network log processing apparatus further includes a storage module 506, configured to store offline log data of the network devices. The log obtaining module 501 is configured to obtain, from the storage module 506, the multiple pieces of to-be-analyzed log data.

In some specific implementations, the feature parsing module 502 is configured to: for each network device, recognize mutation points in log data of the network device, and determine log items corresponding to the mutation points as the features of the network device.

In some specific implementations, the feature parsing module 502 is configured to: analyze corresponding identical events in the multiple pieces of log data, and for each network device, determine log items that correspond to the identical events and that are in log data of the network device as the features of the network device.

In some specific implementations, the network log processing apparatus further includes:

an event pair obtaining module 507, configured to obtain pairing events in a system; and the feature parsing module 502 is configured to: recognize pairing events in the multiple pieces of log data, where for each network device, log items that correspond to the recognized pairing events and that are in log data of the network device are the features of the network device.

In some specific implementations, the apparatus further includes:

a status pair obtaining module 508, configured to obtain pairing statuses in a system; and the feature parsing module 502 is configured to: recognize pairing statuses in the multiple pieces of log data, where for each network device, log items that correspond to the recognized pairing statuses and that are in log data of the network device are the features of the network device.

Optionally, in some specific implementations, the input and output module 505 is further configured to: input an expert knowledge base of event pairs and status pairs of logs, and store the expert knowledge base of the event pairs and the status pairs in the storage module 506. The event pair obtaining module 507 and the status pair obtaining module 508 respectively obtain an event pair and a status pair from the storage module 506.

In some specific implementations, the associated feature determining module 503 is configured to determine features having a maximum association in features. The features having the maximum association are the associated features.

In some specific implementations, the log time alignment module 504 is configured to: obtain a reference time for log alignment, where the reference time is a log time of the associated feature of any network device (a reference network device) of the network devices; and for each network device, determine a calibration time deviation of the network device, where the calibration time deviation is a difference between a log time of the associated feature of the network device and the reference time, and subtract the calibration time deviation from a log time in log data of the network device, so that the log time of the network device is aligned.

In some specific implementations, the log time alignment module 504 is configured to: set a reference time of the associated features, where the reference time is a fault report time; and for each network device, determine a calibration time deviation of the network device, where the calibration time deviation is a difference between a log time of the associated feature of the network device and the reference time, and subtract the calibration time deviation from a log time in log data of the network device, so that the log time of the network device is aligned.

Optionally, the input and output 505 is further configured to output aligned log data for network fault analysis.

In this embodiment, no log server needs to be deployed, and log alignment is performed based on the principle that associated features exist between devices and time at which the associated features occur are same, so that time alignment can be automatically performed on to-be-analyzed logs without relying on the log server, thereby facilitating fault reoccurrence, and improving efficiency and accuracy of fault location and sectionalization.

During actual application, the network log processing apparatus in this embodiment may be a host loaded with a network log alignment application program. For example, the network log processing apparatus may be a server, may be a personal computer, or may be another host. A host in the embodiments is described below from the perspective of a hardware entity.

Figure 6:
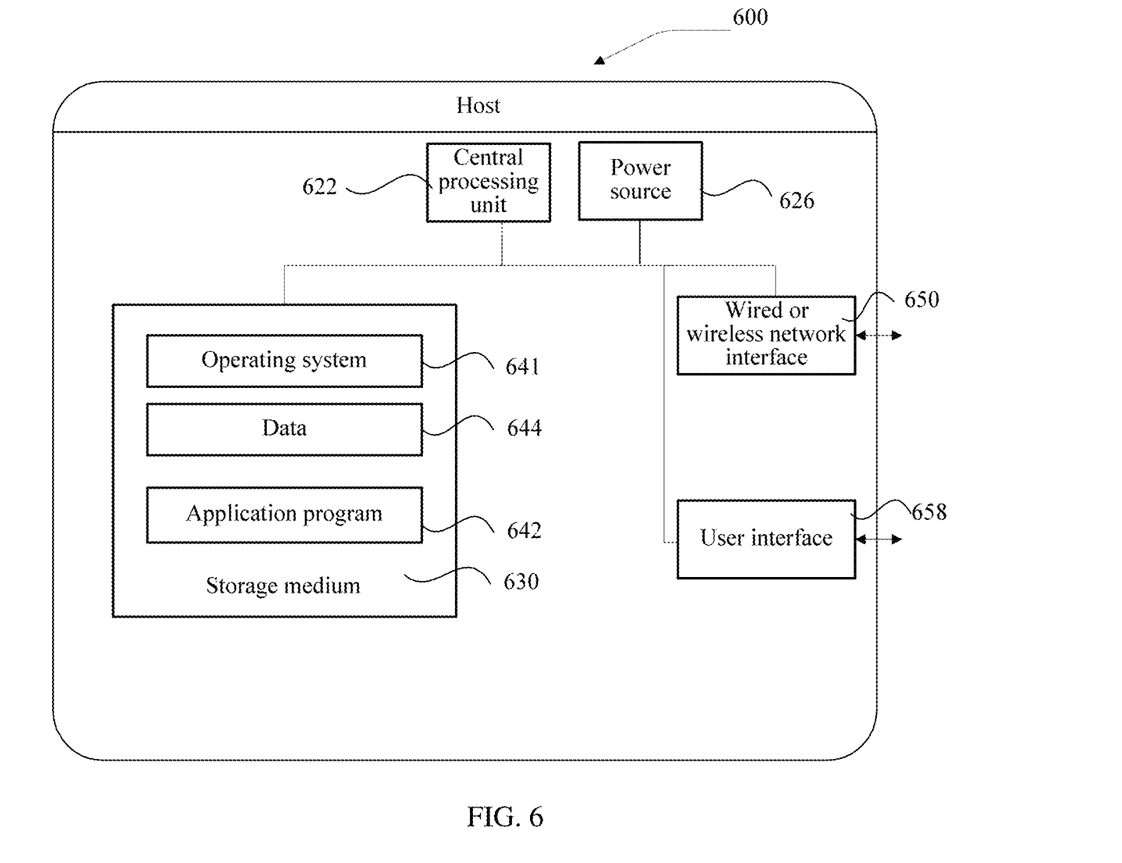
FIG. 6 is a schematic structural diagram of hardware of a host according to an embodiment.

FIG. 6 is a schematic structural diagram of a host according to an embodiment. The host 600 may vary greatly due to different configurations or performance, and may include one or more processors (central processing units, CPU) 622 and one or more memories 630 (for example, one or more mass storage devices) storing an application program 642 or data 644. The memory 630 may perform transient storage or persistent storage. The program stored in the memory 630 may include one or more modules (not marked in the figure). Each module may include a series of instruction operations in the network log processing apparatus in the embodiment shown in FIG. 5. Further, the processor 622 may be configured to: communicate with the memory 630, and perform, in the host 600, the series of instruction operations in the memory 630.

The host 600 may further include one or more power sources 626, one or more wired or wireless network interfaces 650, and one or more operating systems 641, for example, Windows Server™, Mac OS X™, Unix™, Linux™, and FreeBSD™.

Optionally, the host 600 includes a user interface 658, or includes a display (for example, a touchscreen or an LCD), a keyboard, or a click device (for example, a mouse, a trackball, a touch panel, or a touchscreen).

For example, the storage medium 630 stores program instructions corresponding to all or some actions in the method embodiment shown in FIG. 2. The processor 622 executes the program instructions to perform alignment on network log time. For details, refer to the method embodiment shown in FIG. 2, and the details are not described herein again.

The memory 630 stores the raw network log data, the aligned log, the network topology information, the configuration information, and the like that are mentioned in the embodiment shown in FIG. 2, and further stores an expert knowledge base (event pairs or status pairs) for use during log parse.

In addition, the program instruction 642 further provides multiple interfaces, for example, an interface 1, which can input various acquired information (including log data of each network device or topology information in a network) into the host;

an interface 2, configured to introduce a pairing event pair or status pair that is defined by the expert knowledge base;

an interface 3, configured to set an alignment reference time for associated features obtained by way of parsing in a log (referring to the second method in step 204 in the embodiment shown in FIG. 2); and an interface 4, configured to output log data whose log time has been aligned.

It should be noted that the hardware device is merely an example for description. During actual application, the host may be formed by other hardware. This is not limited herein.

The terms "include", "contain" and any other variants in the embodiments, claims, and the accompanying drawings mean to cover the non-exclusive inclusion, for example, a process, method, system, product, or device that includes a list of steps or units is not necessarily limited to those steps or units that are expressly listed, but may include other steps or units that are not expressly listed or inherent to such a process, method, product, or device.

It may be clearly understood by persons of ordinary skill in the art that, for the purpose of convenient and brief description, for a detailed working process of the foregoing system, apparatus, and unit, refer to a corresponding process in the foregoing method embodiments, and details are not described herein again.

In the several embodiments provided, it should be understood that the system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments may be integrated into one processing unit, or each of the units may exist alone physically, or two or more units are integrated into one unit. The integrated unit may be implemented in a form of hardware or may be implemented in a form of a software functional unit.

The foregoing embodiments are merely intended for describing solutions, but are not limiting. Although the embodiments are described in detail, persons of ordinary skill in the art should understand that they may still make modifications to the solutions described in the foregoing embodiments or make equivalent replacements to some features thereof, without departing from the spirit and scope of the solutions of the embodiments.

What is claimed is:

1. A network log time alignment method, comprising:
   obtaining log data of one or more network devices;
   parsing the log data of the one or more network devices to obtain features of each network device;
   for each network device, recognizing mutation points in the log data of the network device, wherein mutation points are points at which a curve changes from a horizontal direction to an oblique direction;
   determining associated features of the one or more network devices according to the features of each network device; and
   performing alignment on log time in the log data of the one or more network devices according to the associated features.

2. The method according to claim 1, wherein the parsing the log data of the one or more network devices to obtain features of each network device further comprises:
   determining log items corresponding to the mutation points as the features of the network device.

3. The method according to claim 1, wherein the parsing the log data of the one or more network devices to obtain features of each network device comprises:
   obtaining identical events in the log data of the one or more network devices by means of analysis; and
   for each network device, determining log items that correspond to the identical events and that are in log data of the network device as the features of the network device.

4. The method according to claim 1, wherein the method further comprises:
   obtaining pairing events in a system; and
   the parsing the log data of the one or more network devices to obtain features of each network device comprises:
   recognizing the pairing events in the log data of the one or more network devices; and
   for each network device, determining log items corresponding to the pairing events as the features of the network device.

5. The method according to claim 1, wherein the method further comprises:
   obtaining pairing statuses in a system; and
   the parsing the log data of the one or more network devices to obtain features of each network device comprises:
   recognizing the pairing statuses in the log data of the one or more network devices; and for each network device, determining log items corresponding to the pairing statuses as the features of the network device.

6. The method according to claim 1, wherein each network device has multiple features, and the determining associated features of the one or more network devices according to the features of each network device comprises:
  determining features having a maximum correlation in multiple features of the one or more network devices, wherein the features having the maximum correlation are the associated features of the one or more network devices.

7. The method according to claim 1, wherein the performing alignment on log time in the log data of the one or more network devices according to the associated features comprises:
  obtaining a reference time for log alignment, wherein the reference time is a log time of the associated feature in log data of a reference network device, and the reference network device is a network device determined in the one or more network devices; and
  for each network device, determining a calibration time deviation of the network device, wherein the calibration time deviation is a difference between a log time of the associated feature of the network device and the reference time, and subtracting the calibration time deviation from a log time in log data of the network device, so that the log time of the network device is aligned with a log time of the reference network device.

8. The method according to claim 1, wherein the performing alignment on log time in the log data of the one or more network devices according to the associated features comprises:
  setting a reference time of the associated features, wherein the reference time is a fault report time; and
  for each network device, determining a calibration time deviation of the network device, wherein the calibration time deviation is a difference between a log time of the associated feature of the network device and the reference time, and subtracting the calibration time deviation from a log time in log data of the network device, so that the log time of the network device is aligned with a log time of another network device.

9. A network log processing apparatus, comprising:
  a processor; and
  a non-transitory computer-readable storage medium coupled to the processor and storing programming instructions for execution by the processor, the programming instructions instruct the processor to:
  obtain log data of one or more network devices;
  parse the log data of the one or more network devices to obtain features of each network device;
  recognize mutation points in the log data of the network device, wherein mutation points are points at which a curve changes from a horizontal direction to an oblique direction;
  determine associated features of the one or more network devices according to the features of each network device; and
  perform alignment on log time in the log data of the one or more network devices according to the associated features.

10. The apparatus according to claim 9, wherein the programming instructions further instruct the processor to:
  for each network device, determine log items corresponding to the mutation points as the features of the network device.

11. The apparatus according to claim 9, wherein the programming instructions instruct the processor to:
  obtain identical events in the log data of the one or more network devices by means of analysis; and
  for each network device, determine log items that correspond to the identical events and that are in log data of the network device as the features of the network device.

12. The apparatus according to claim 9, wherein the programming instructions instruct the processor to:
  obtain pairing events in a system; and
  recognize the pairing events in the log data of the one or more network devices; and
  for each network device, determine log items corresponding to the pairing events as the features of the network device.

13. The apparatus according to claim 9, wherein the programming instructions instruct the processor to:
  obtain pairing statuses in a system; and
  recognize the pairing statuses in the log data of the one or more network devices; and
  for each network device, determine log items corresponding to the pairing statuses as the features of the network device.

14. The apparatus according to claim 9, wherein each network device has multiple features; and the programming instructions instruct the processor to:
  determine features having a maximum correlation in multiple features of the one or more network devices, wherein the features having the maximum correlation are the associated features of the one or more network devices.

15. The apparatus according to claim 9, wherein the programming instructions instruct the processor to:
  obtain a reference time for log alignment, wherein the reference time is a log time of the associated feature in log data of a reference network device, and the reference network device is a network device determined in the one or more network devices; and
  for each network device, determine a calibration time deviation of the network device, wherein the calibration time deviation is a difference between a log time of the associated feature of the network device and the reference time, and subtract the calibration time deviation from a log time in log data of the network device, so that the log time of the network device is aligned with a log time of the reference network device.

16. The apparatus according to claim 9, wherein the programming instructions instruct the processor to:
  set a reference time of the associated features, wherein the reference time is a fault report time; and
  for each network device, determine a calibration time deviation of the network device, wherein the calibration time deviation is a difference between a log time of the associated feature of the network device and the reference time, and subtract the calibration time deviation from a log time in log data of the network device, so that the log time of the network device is aligned with a log time of another network device.

* * * * *